Figure 1:
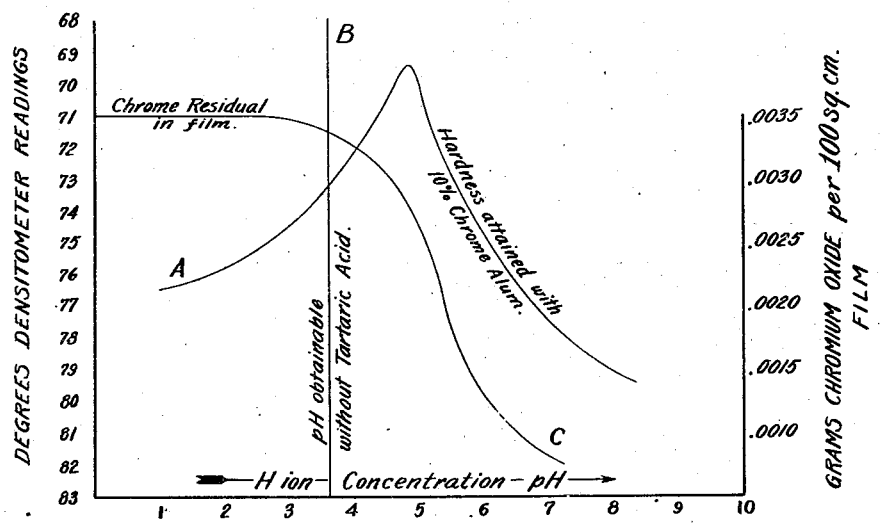

July 7, 1936.  B. B. BURBANK  2,046,320

METHOD OF MAKING HARDENED GELATIN FILMS AND RESULTING PRODUCT

Filed Oct. 25, 1934

Inventor,
Benjamin B. Burbank,
by Roberts, Cushman & Woodberry
Attys.

Patented July 7, 1936

2,046,320

UNITED STATES PATENT OFFICE 2,046,320

METHOD OF MAKING HARDENED GELATIN FILMS AND RESULTING PRODUCT

Benjamin B. Burbank, Brunswick, Maine, assignor to Technicolor Motion Picture Corporation, Hollywood, Calif., a corporation of Maine Application October 25, 1934, Serial No. 749,961

20 Claims. (Cl. 18—57)

This invention relates to a method of preparing hardened gelatin films, suitable for imbibition printing and the like, and to the resulting product.

In the art of hardening gelatine films or surfaces it has heretofore been found that the hardening liquor employed may advantageously be neturalized in order to provide an improved hardening action. The reason for neutralizing the hardening liquor is probably attributable to the fact that the swelling of proteins depends upon the chemical concentration of water molecules about the primary amino groups of the protein molecule, whereas the same amino groups participate materially in the hardening reaction with tanning agents. Therefore, the water molecules and the hardening agent may be said to compete in their reaction with the protein molecule, and, since the amount of hydrate water increases with the acidity, it follows that the hardening action is reduced by high acidity and the resulting abundancy of hydrate water; conversely neutralization, and hence diminution of such tendency to hydration, is favorable to the hardening reaction. It has also been found that the most favorable tanning action takes place if the hardening solution has a pH or hydrogen ion concentration near the isoelectric point of the material to be hardened. However, the isoelectric points of gelatin, and other proteins have values which could heretofore not be obtained in hardening solution such as chrome or alum solutions of workable concentration, (and more particularly chrome alum solutions) since the normal chrome salt or alum solutions precipitate before the desired neutralization is reached, the pH value at the point of precipitation depending upon the concentration of the solution. The lower the concentration, the more alkaline the solution may be made without precipitation. For example, with chrome concentrations of 1% and even less, precipitation may be practically complete at pH 5.3, whereas with higher concentrations, as for example 15 to 20%, precipitation may begin at pH 3.5. The desirable pH corresponding to the isoelectric point of protein could, heretofore, not be reached with concentration higher than 3 to 4%.

It is therefore the principal object of the present invention to provide a method for neutralizing hardening liquors to any desired degree, without incurring precipitation. As applied especially to the hardening of gelatin film, such as that used as blank film for the printing thereon of dye pictures from matrices (the so-called imbibition process) some of the objects of the invention are to provide a method for obtaining a degree of gelatin hardness, which is an optimum for the purpose of such blanks, to provide such a method which permits hardening at the isoelectric point of the gelatin, with an increased range of concentrations of the hardening reagent and to accomplish this hardening action with a minimum amount of the hardening agent.

In another aspect, it has been found by experimentation that for a given concentration of hardening liquor the hardened material requires and retains more of the hardening agent, the more acidic the hardening solution. Accordingly, the material requires a considerable time to reach a stable condition, that is, constant hardness after manufacture, when it has been treated in a relatively acidic hardening bath. It is, therefore, another object of the present invention to provide a method for hardening proteins, as for example gelatin, to a desired degree of hardness without incurring serious changes of its qualities subsequent to manufacture.

In still another aspect, it is sometimes desirable, especially in the production of the above-mentioned blank film for imbibition printing, to add to the hardening bath such ordinarily violent precipitants as sulfides, sulfites and thiosulfates, and it is a further object of the present invention to provide a method which permits the adding to hardening solutions of such sulfur salts without danger of precipitation.

Figure 2:
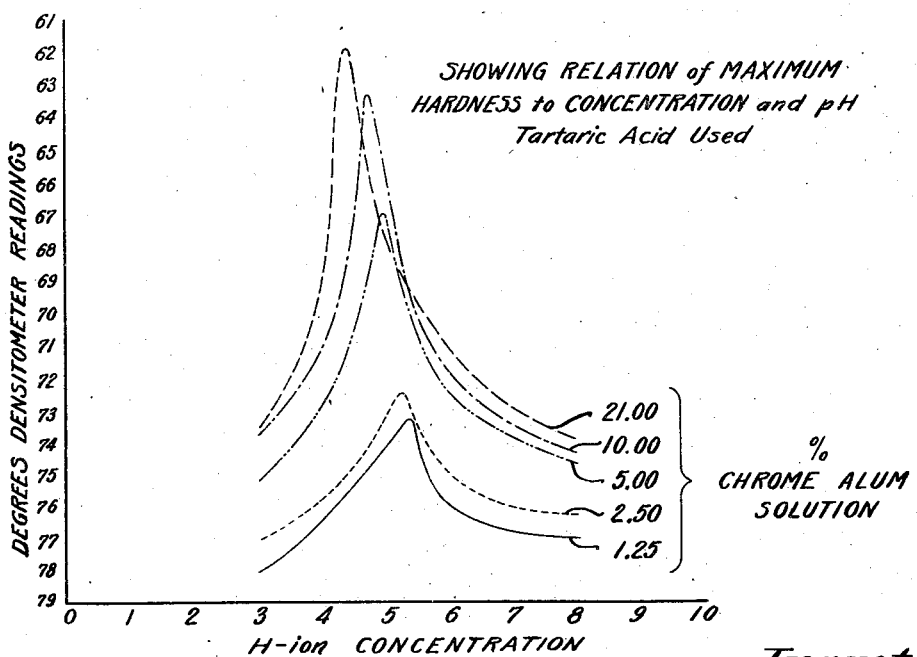

Other objects and advantages of the invention will be apparent from the following detailed description which refers to the accompanying drawing in which Fig. 1 represents curves showing the hardness and residual chromium contents of a gelatin film treated according to the invention with reference to the hydrogen-ion concentration of the hardening bath in which it has been treated; and Fig. 2 presents curves showing the variations in hardness obtainable with different concentrations of chrome alum solutions, prepared in accordance with this invention.

The following description refers especially to the treatment of blank film for imbibition printing with chrome hardeners, but it is expressly understood that the new method is also applicable to the analogous treatment of other proteins.

As mentioned before, chrome solutions precipitate upon reaching a certain neutralization. For example, the isoelectric point of gelatin as used in photographic films is approximately 4.7. But a sufficiently reactive concentration of the chrome alum bath is about 3 to 4% which has a pH value of about 3.6. If a neutralizing agent is added to a chrome alum hardening bath of that concentration until a pH of 4.7 is reached the chromium component is precipitated until there remains only 1% or less chrome alum actually in solution, which concentration has been found unsuitable for hardening. If a chrome alum bath of 3 to 4% is first neutralized to a point just short of precipitation, a pH of about 3.4 to 3.9 can be reached. But this is too low for rapid hardening.

According to the present invention, tartaric acid, or a salt thereof, or glycerine, is added to the chrome hardening bath (consisting for example of a solution of chrome alum or chromic sulfate, preferably, but not necessarily in proportions governed by the chromium percentage, namely roughly one mol. tartaric acid to one atom chromium) and this mixture is subsequently brought to just the boiling point. Subsequent to this procedure, any amount of neutralizer, as for example ammonium hydroxide or such alkaline substances as sodium acetate, or even of vigorous precipitants as sodium sulfide, or sulfites and thio-sulphates, can be added without causing precipitation. It is quite feasible in this manner to obtain a pH value of 9.0 with substantially any chromium concentration.

Referring now to the figure, curve A shows the degrees of hardness which can be obtained by treating photographic gelatin with a 10% chrome alum solution of varying acidity, arbitrary units of hardness being plotted over pH values, whereby the hardness is expressed by the rate of dye penetration, as established by bathing treated gelatin films in a standard dye solution for a given time, and by determining the amount of dye absorbed by means of optical measurements. The line B indicates the pH value of the chrome alum bath which can be obtained without the use of tartaric acid, and it indicates that the neutralization of the 10% chrome alum bath could heretofore not be continued beyond a pH of about 3.6, the chrome beginning to precipitate at that point. This is avoided by using the tartaric acid treatment according to the invention, and the curve A continues as indicated, a maximum being reached with hardening solutions having a pH of approximately 4.9, from which point the hardening drops again with increasing pH.

For different chromium concentrations, the hardness-pH-concentration curves have similar shapes, the limit line B moving towards the right with decreasing concentrations and the positions and values of the peaks of obtainable hardness also varying corresponding to varying values of pH of the liquor. Therefore, since the absolute degree of hardness depends upon the chromium concentration, and since with the new method a pH close to that of the isoelectric point for gelatin may be had at any chromium concentration, it will now be apparent that the most favorable hardness can be attained with the minimum amount of chrome.

Curve C indicates the amount of residual chromium found in a gelatin film after treatment with tartaric acid treated chrome alum solution of a certain concentration, chromium units being plotted over pH values. The curve shows that in a general way the residual chromium content decreases rapidly, with rise in pH values, in the pH range in which the greatest degree of hardness of the film is effected. Therefore, the above-mentioned detrimental effect of the residual chromium, namely the uncontrollable subsequent hardening, which lessens the keeping capacity of hardened film blanks very much, can be avoided by hardening at a pH value at which the residual chromium is reduced substantially to a minimum, and still further reduced by subjecting to alkaline washing (to raise the pH value to 5 or 6 for example) so that it is possible to harden to a certain predetermined extent and to preserve the film at that hardness after the hardening treatment.

Further, as mentioned hereinbefore, the tartaric acid may be used to prevent precipitation of chromium when adding to the hardening bath such substances as sulfides, sulfites, or thiosulfates, whose use may be advantageous in the production of blank film for imbibition processes.

It has been found that the tartaric acid treatment according to this invention is applicable not only to chrome hardeners as chrome alum, chromic sulfate and other more or less complex chromium salts, but also to hardening solutions prepared with other chromic salts, such as sodium or ammonium alums, as well as potassium alum.

As an example for the commercial hardening of a blank film for imbibition printing, that is, a celluloid film covered with a layer of plain gelatin, the following embodiment of the invention is described. The hardening solution is prepared by dissolving 525 grams of chrome alum $$Cr_2(SO_4)_3K_2SO_424H_2O$$

in 10 liters of water and by adding 150–200 grams of tartaric acid $$[2(CH.OH.CO_2H)].$$

The solution may then be brought to a boil or approximately to boiling temperature. After cooling, ammonium hydroxide is added until the pH reaches about 4.7; the pH value being determined by any suitable one of the well known conventional methods used for this purpose. The amount of ammonium hydroxide necessary for this purpose is about 150–200 cubic centimeters.

If reducing compounds, such as the compounds of sulphur above mentioned, are to be employed, they may be added at this stage or may be used in whole or in part as the alkaline reagents with which to adjust the pH value of the treating liquor, in place of the ammonium hydroxide, for example. But such additions are made slowly and quickly dispersed in the reagent solution so as to avoid the formation of local concentrations which tend to precipitate the metal component of the reagent and the redissolving of such precipitates is difficult and impractical if not impossible. The same precaution is to be observed in the neutralizing step. The film remains in this bath for approximately 3 minutes at a temperature of about 64° F., whereupon it is removed, washed and dried for storage or immediate use.

It should be understood that the present disclosure is for the purpose of illustration only and that this invention includes all modifications and equivalents which fall within the scope of the appended claims.

I claim:

1. Method of treating reagent solutions for the hardening of gelatin and the like, which comprises adding tartaric acid thereto and subsequently neutralizing the same, thereby permitting the neutralizing step to be effected over a wide range of pH values without precipitation of the hardening agent.

2. Method of treating reagent solutions for the hardening of gelatin and the like, which comprises adding tartaric acid thereto, bringing the solution to a boil, and neutralizing said liquor, thereby permitting the neutralizing steps to be effected over a wide range of pH values without precipitation of the hardening agent.

3. Method of treating alum solutions for hardening gelatin and the like, which comprises adding an organic acid thereto in approximately equimolecular proportions, and subsequently neutralizing said liquor, whereby precipitation is prevented over a wide range of hydrogen ion concentration values, regardless of the concentration of the solution.

4. Method of hardening gelatin films or the like with basic alum solutions, which comprises adding tartaric acid to the hardening solution, bringing the solution to a boil, neutralizing the solution approximately to the isoelectric point of the gelatin, and subsequently bathing the gelatin film in the solution.

5. Method of hardening gelatin films with a chrome alum hardening solution which comprises adding tartaric acid thereto, in the proportions of approximately one mol. tartaric acid to one mol. of chrome alum, bringing the solution approximately to a boil, neutralizing with ammonium hydroxide to the isoelectric point of the gelatin of the film, and bathing the film in the resulting solution.

6. Method of treating alum solutions for the hardening of gelatin and the like which comprises adding an organic acid to the solution, bringing approximately to a boil, and subsequently neutralizing with a reducing compound of sulfur without precipitation of the hardening agent.

7. Method of treating alum solutions for the hardening of gelatin and the like which comprises adding an organic acid to the solution, bringing approximately to a boil, and subsequently neutralizing with a soluble sulfide without precipitation of the hardening agent.

8. Method of treating alum solutions for the hardening of gelatin and the like which comprises adding an organic acid to the solution, bringing approximately to a boil, and subsequently neutralizing with a soluble sulfite without precipitation of the hardening agent.

9. Method of treating alum solutions for the hardening of gelatin and the like which comprises adding an organic acid to the solution, bringing approximately to a boil, and subsequently neutralizing with a soluble thiosulfate without precipitation of the hardening agent.

10. Method of obtaining an optimum hardness of gelatin film with a hardening solution containing a minimum amount of chromium, which comprises dissolving the chrome hardening agent in water, adding tartaric acid in approximately equimolecular proportions, neutralizing to approximately the isoelectric point of the gelatin of said film, and bathing said film in said solution, the amount of hardening agent retained being restricted to a degree which produces the maximum hardness at the isoelectric point of said gelatin.

11. Method of obtaining an optimum hardness of gelatin film with a hardening solution containing a minimum amount of chromium, which comprises dissolving the chrome hardening agent in water, adding tartaric acid in approximately equimolecular proportions, neutralizing to a pH slightly above the isoelectric point of the gelatin of said film, and bathing said film in said solution, the amount of hardening agent retained being restricted to a degree which produces the maximum hardness at the isoelectric point of said gelatin.

12. Method of making film blanks for imbibition printing comprising as a step subjecting the film to a hardening reagent while controlling the pH to approximate the isoelectric point of gelatin in the presence of an organic acid radical.

13. Method of making film blanks for imbibition printing comprising as a step subjecting the film to a hardening reagent while controlling the pH to approximate the isoelectric point of gelatin in the presence of tartaric acid.

14. Method of making film blanks for imbibition printing comprising as a step subjecting the film to a hardening reagent while controlling the pH to approximate the isoelectric point of gelatin in the presence of acetic acid.

15. Method of making film blanks for imbibition printing comprising as a step subjecting the film to a hardening solution of alum while controlling the pH to approximate the isoelectric point of gelatin in the presence of an organic acid radical.

16. Method of making film blanks for imbibition printing comprising as a step subjecting the film to a hardening solution of chrome alum while controlling the pH to approximate the isoelectric point of gelatin in the presence of tartaric acid.

17. Method of making film blanks for imbibition printing comprising as a step subjecting the film to a hardening reagent while controlling the pH to approximate the maximum hardening point for gelatin, in the presence of an organic acid radical.

18. A hardening solution, for hardening gelatin and the like, comprising an alum hardening reagent and an organic acid radical and characterized by having a pH value approximating the isoelectric point of gelatin.

19. A hardening solution, for hardening gelatin and the like, comprising a chrome alum hardening reagent and an organic acid radical and characterized by having a pH value approximating the isoelectric point of gelatin.

20. A hardening solution, for hardening gelatin and the like, comprising a chrome alum hardening reagent and tartaric acid radical and characterized by having a pH value approximating the isoelectric point of gelatin.

BENJAMIN B. BURBANK.